US008470078B2

(12) United States Patent
Robertson

(10) Patent No.: US 8,470,078 B2
(45) Date of Patent: Jun. 25, 2013

(54) PROCESS FOR REMOVING TAR FROM SYNTHESIS GAS

(75) Inventor: Mark Robertson, Houston, TX (US)

(73) Assignee: IHI E&C International Corporation, Houston, TX (US)

( * ) Notice: Subject to any disclaimer, the term of this patent is extended or adjusted under 35 U.S.C. 154(b) by 1223 days.

(21) Appl. No.: 12/046,835

(22) Filed: Mar. 12, 2008

(65) Prior Publication Data

US 2009/0229464 A1   Sep. 17, 2009

(51) Int. Cl.
   *C01B 3/52*   (2006.01)
   *B01D 53/14*   (2006.01)

(52) U.S. Cl.
   USPC .............................................. 95/168; 95/237

(58) Field of Classification Search
   USPC ................... 95/149, 186, 237–240, 159, 168, 95/162–163, 191, 207; 96/243
   See application file for complete search history.

(56) References Cited

U.S. PATENT DOCUMENTS

| 2,069,191 | A |   | 1/1937 | Atwell |
| 2,863,527 | A | * | 12/1958 | Becker et al. .................... 62/625 |
| 3,639,261 | A | * | 2/1972 | Slater ............................ 252/373 |
| 3,999,963 | A | * | 12/1976 | Ririe, Jr. ......................... 95/206 |
| 4,153,514 | A |   | 5/1979 | Garrett et al. |
| 4,235,675 | A |   | 11/1980 | Bechthold |
| 4,544,477 | A |   | 10/1985 | Taylor |
| 5,643,421 | A |   | 7/1997 | Smith |
| 6,015,440 | A | * | 1/2000 | Noureddini ..................... 44/388 |
| 6,068,793 | A |   | 5/2000 | Kiss |
| 6,211,254 | B1 |   | 4/2001 | Whitney |
| 6,298,651 | B1 | * | 10/2001 | Iijima ............................. 60/780 |
| 6,564,580 | B2 |   | 5/2003 | Bowen et al. |
| 7,147,689 | B1 |   | 12/2006 | Miller |
| 7,544,830 | B2 | * | 6/2009 | Parnas et al. ................... 560/217 |
| 7,608,743 | B2 | * | 10/2009 | Olah et al. ..................... 568/885 |
| 7,638,314 | B2 | * | 12/2009 | Zappi et al. .................... 435/134 |
| 7,667,081 | B2 | * | 2/2010 | Rezkallah ...................... 568/870 |
| 7,803,845 | B2 | * | 9/2010 | Boerrigter et al. ............ 518/726 |

FOREIGN PATENT DOCUMENTS

| EP |   0 193 327 A1 |   | 9/1986 |
| GB |   159905 |   | 3/1921 |
| GB |   1245587 |   | 9/1971 |
| NL |   7111477 |   | 2/1973 |
| WO |   03/018723 A1 |   | 3/2003 |
| WO |   WO 03/018723 A1 | * | 3/2003 |
| WO |   2007/112314 A2 |   | 10/2007 |

* cited by examiner

*Primary Examiner* — Frank Lawrence, Jr.
(74) *Attorney, Agent, or Firm* — Rothwell, Figg, Ernst & Manbeck, P.C.

(57) ABSTRACT

A process and system for removing tars from synthesis gas uses glycerol produced as a byproduct of biodiesel manufacture. The biodiesel may be made from various oil feedstocks such as canola, rapeseed, or soybean oils. Associated with the harvesting of these crops may be the ready availability of byproduct biomass useful as feedstock for gasification. In addition, methanol may be sourced from the gasification of biomass to exploit a potential synergy between biodiesel manufacture and biomass gasification. The present invention develops those synergies further by making use of a byproduct stream from the manufacture of biodiesel to remove tars from the gasifier synthesis gas and to provide a useful end use for the byproduct.

19 Claims, 2 Drawing Sheets

PROCESS FOR REMOVING TAR FROM SYNTHESIS GAS

BACKGROUND OF THE INVENTION

I. Field of the Invention

This invention relates to the field of biofuel production, and in particular to the removal of tars from synthesis gas produced from biomass feedstock.

II. Description of the Related Art

Tars are generated in the gasification of biomass and other carbonaceous feedstocks to produce synthesis gas. Tars are a significant impediment to the utilization of synthesis gas due to their tendency to condense and foul downstream equipment and deactivate catalysts.

Conventional aqueous scrubbing techniques can remove many of the tars from the synthesis gas, but generate a waste water stream, which requires significant downstream treatment, and the heavy polyaromatic hydrocarbons (PAH) tars can precipitate and foul the scrubbing equipment. In addition, synthesis gas produced by aqueous scrubbing is not suitable for some power and all chemical applications.

Rising fossil fuel prices have also generated increased interest in biodiesel. However, current processes for biodiesel production utilize methanol derived from relatively expensive fossil fuel sources, such as natural gas, and generate waste byproducts of lower value such as glycerol. Biodiesel and glycerol are produced from the transesterification of vegetable oils and fats with alcohol (methanol) in the presence of a catalyst (NaOH or KOH). About 10 wt % of the vegetable oil is converted into glycerol during the transesterification process. Crude glycerol has the following typical composition: 75 wt. % glycerol, 10 wt. % ash, 10 wt. % water and 5 wt. % other organic matter.

Glycerol markets are currently limited and an increase in biodiesel production would cause glycerol prices to decline further. At these low prices it would become less attractive to recover high purity glycerol from crude glycerol. Generally, purification of crude glycerol is energy intensive, such as purification via vacuum distillation.

Further improvements are needed to reduce cost and increase efficiency of biofuel production processes.

SUMMARY OF THE INVENTION

Accordingly, it is an object of the present invention to overcome one or more of the deficiencies of the prior art. For example, one aspect of the invention adds value to the crude glycerol byproduct of a biodiesel process by using the glycerol as a gasification or pyrolysis feedstock. In another aspect of the invention, crude glycerol is used to treat synthesis gas in a process that generates methanol as a byproduct, which is subsequently used for production of biodiesel.

In accordance with one embodiment, the present invention constitutes a process for removing tars from synthesis gas, comprising the treatment of the synthesis gas, containing a first amount of tars that impede utilization, with glycerol to produce a first stream of synthesis gas containing a second amount of tars less than the first amount and a second stream containing a rich glycerol and tars solution. The synthesis gas is obtained by gasifying a biomass feedstock to produce synthesis gas containing a first amount of tars that impede utilization. In an embodiment, the glycerol used in the treatment step comprises glycerol obtained by conditioning or recycling crude glycerol from a biodiesel process.

In a second embodiment, the glycerol used in the treatment step is obtained by combining the crude glycerol from a biodiesel process and the rich glycerol and tars solution from the treatment step to make a combined solution and subsequently conditioning the combined solution to obtain conditioned glycerol. The conditioning step preferably includes stripping the glycerol and tars from the combined solution to produce a conditioned glycerol stream. Subsequently, a small amount of heavy tars and glycerol can be purged from the conditioned glycerol stream and the remainder of the conditioned glycerol stream can be sent to the scrubber column.

In this second embodiment, the treatment step comprises scrubbing the synthesis gas with the conditioned glycerol. The scrubbing step includes feeding the synthesis gas, obtained from the gasifying step, containing a first amount of tars that impede utilization, and the conditioned glycerol into a scrubber column to produce an overhead stream of synthesis gas containing a second amount of tars less than the first amount and a bottom stream containing a rich glycerol and tars solution. In another embodiment, the overhead stream may be further refined by feeding it into an aqueous scrubber.

In accordance with a third embodiment of the present invention, the conditioning of the combined solution comprises stripping the glycerol and tars from the combined solution to produce a first stream containing steam and tars and a second stream containing conditioned glycerol. In this embodiment, the stripping is preferably achieved by feeding the combined solution into a stripper column to produce an overhead stream containing steam and tars and a bottom stream comprising the conditioned glycerol stream. The process preferably further comprises purging a small amount of heavy tars and glycerol from the conditioned glycerol stream. In this embodiment of the invention, the overhead stream from the stripper column can be sent to a gasifier to serve as a moderating stream. In another embodiment, alternatively, the overhead stream from the stripper column can be condensed and treated to recover saleable product. In accordance with the present invention, the remainder of the conditioned glycerol solution obtained from the stripper column bottoms, which is not purged, is recirculated to the scrubbing column. The purged amount of the conditioned glycerol stream can be sent to a gasifier. In another embodiment, the purged amount of the conditioned glycerol stream can be used as a liquid fuel, and in yet another embodiment, the purged amount of the conditioned glycerol stream can be treated to recover saleable product.

In a fourth embodiment, the present invention comprises a process for producing biodiesel from seed oils wherein the crude glycerol conditioned for use in scrubbing the synthesis gas is a byproduct of the biodiesel producing step. In this embodiment the biomass gasified in a biomass gasifier to produce synthesis gas is obtained from the biomass byproduct resulting from the harvesting of the seed oils used in the biodiesel producing step. In this embodiment, the invention further comprises a process wherein the gasifying step produces methanol and wherein the biodiesel producing step includes using the methanol to produce biodiesel.

In a fifth embodiment, the present invention comprises a system for removing tar from synthesis gas comprising scrubbing the synthesis gas containing a first amount of tars that impede utilization in a scrubber column with glycerol to produce an overhead stream of synthesis gas containing a second amount of tars less than the first amount and a bottoms stream containing a rich glycerol and tars solution. In this embodiment, the system comprises a source of synthesis gas, a source of glycerol, and a scrubber column. In this embodiment, synthesis gas is produced by gasification of a biomass feedstock and is fed into the lower portion of the scrubber column. Furthermore, glycerol is fed into the upper portion of the scrubber column to remove tars from the synthesis gas containing a first amount of tars that impede utilization. In this embodiment, the system further comprises a stripping column wherein crude glycerol obtained from a biodiesel process and the scrubber bottoms stream containing a rich glycerol and tars stream are conditioned to remove tars and produce a conditioned glycerol stream.

In a sixth embodiment, the present invention comprises a system for co-producing biodiesel and synthesis gas by synergistically operating a biodiesel plant and biomass gasifier. In this embodiment, the invention comprises: a biodiesel plant in which production comprises biodiesel and crude glycerol; a biomass gasifier in which production comprises synthesis gas; a synthesis gas treatment plant; seed oil extractor wherein seed oil is extracted from seeds and plant material; a power plant in which production comprises power and steam; and a chemical plant in which production comprises methanol and other chemicals. In this embodiment seed oil is extracted from seeds and plant material and used for biodiesel production in the biodiesel plant. The biomass byproduct from extracting the seed oil is used to fuel the biomass gasifier.

Still referring to this embodiment of the present invention, the system comprises treating the synthesis gas obtained from the biomass gasifier with crude glycerol obtained from the biodiesel production plant wherein the crude glycerol obtained from the biodiesel production plant may be conditioned prior to treating the synthesis gas obtained from the biomass gasifier. Furthermore, in this embodiment, a power plant is operated with the synthesis gas and used to produce power and steam to drive the biomass gasifier and biodiesel production plant. In another embodiment, alternatively, the power plant is used to produce power and steam for commercial sale. Moreover, in this embodiment of the present invention, the synthesis gas is used for operating a chemical plant which produces methanol for use in the biodiesel plant. In yet another embodiment of the present invention, the synthesis gas is used to operate a chemical plant to produce other chemicals and fuels for commercial sale.

The present invention addresses a need in the art for an improved method and apparatus for removing tars from synthesis gas. Furthermore, the present invention realizes potential synergies between biomass gasification and biodiesel production. Additionally, the present invention reduces both the water treatment requirements associated with synthesis gas scrubbing and the steam requirements for biomass gasifiers. Other objects and advantages of the present invention will be apparent to those skilled in the art from the following description of the preferred embodiments.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
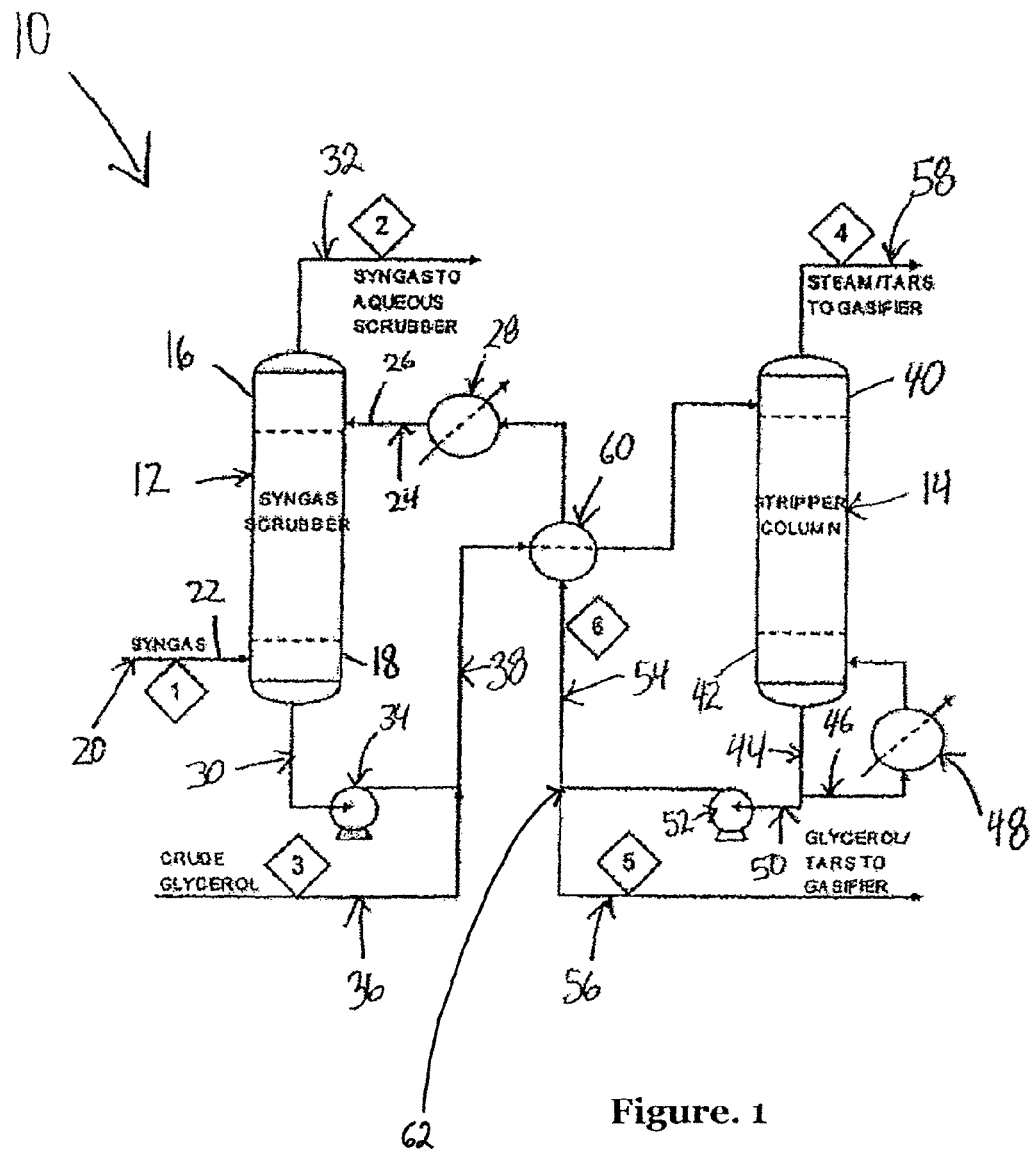
FIG. 1 is a schematic diagram of a system for removing tar from synthesis gas in accordance with the present invention.

In FIG. 1 a system 10 for removing tars from synthesis gas according to the present invention is shown. The system includes a non-aqueous scrubber column 12 and a stripper column 14. The scrubber column 12 includes upper and lower portions 16 and 18. The lower portion 18 of the scrubber column 12 is in communication with a source of synthesis gas 20 via a first feedline 22. The upper portion 16 is in communication with a source of glycerol 24 via a second feedline 26 having previously passed through a heat-exchange and heater 28. The lower portion of the scrubber column 18 includes an exiting bottoms stream 30 while the upper portion 16 includes an exiting overhead stream 32. The exiting bottoms stream 30 is pumped 34 into a line containing a crude glycerol stream 36 to form a combined stream 38. The exiting overhead stream 32 is sent to an aqueous scrubber.

Referring still to FIG. 1, the stripper column 14 includes upper and lower portions 40 and 42. The upper portion of the stripper column 40 is in communication with the combined stream 38. A bottoms stream 44 containing conditioned glycerol originates from the lower portion 42 of the stripper column. A first portion 46 of the bottoms stream 44 is heated in a reboiler 48 and a second portion 50 of the stream is pumped at 52 and subsequently purged 62 to provide a stream of conditioned glycerol 54 which is recirculated to the scrubber column 12 and a stream of conditioned glycerol 56 that can be sent to a gasifier. The conditioned glycerol stream 54 passed through heat exchanger 60 and heater 28 and is sent to the upper portion of the scrubber column 16. The upper portion of the stripper column 40 includes an exiting overhead stream 58 and, in an embodiment of the invention, the overhead stream from the stripper column 14 is sent to a gasifier.

In one embodiment of the invention, synthesis gas 20 with a first amount of tars preventing utilization is fed into the lower portion of the scrubber column 18. A second stream comprising conditioned glycerol 24 is fed into the scrubber column 12 at a level above the synthesis gas input. In the scrubber column 12, the higher solubility of tars in glycerol relative to synthesis gas results in the glycerol solution removing tar from the synthesis gas stream.

Referring still to FIG. 1, the scrubber column 12 produces an overhead stream 32 containing synthesis gas having a second amount of tars less than the first amount and a bottoms stream 30 containing a rich scrubbing solution comprised of glycerol and tars. The overhead stream 32 containing synthesis gas with a second amount of tars less than the first is sent to an aqueous scrubber to remove water thereby producing a stream of synthesis gas suitable for use in various applications. The bottoms stream 30 containing the rich scrubbing solution is pumped 34 into, and combined with, a stream of crude glycerol 36 obtained from a biodiesel production process. The combined stream 38 of the rich scrubbing solution and the crude glycerol is measured 60 and subsequently fed into the upper portion of a stripper column 40.

Referring still to FIG. 1, in the stripper column 14, the lighter and more volatile tars are removed from the combined stream 38 of rich scrubbing solution and crude glycerol and are made to exit the top of the stripper column 14 as an overhead stream 58 containing steam and the lighter and more volatile tars. This overhead stream 58 is subsequently sent to a gasifier. The conditioned glycerol stream 44 exits the bottom 42 of the stripper column 14 where a reboiler 48 heats a portion 46 of the conditioned glycerol stream allowing for further removal of steam and lighter and more volatile tars via the stripper column 14. The remaining portion 50 of the conditioned glycerol stream is pumped at 52 and a small amount of heavy tars and glycerol are subsequently purged 62 producing a first conditioned glycerol stream 54 and a second conditioned glycerol stream 56. The second conditioned glycerol stream 56 is sent to a gasifier while the first conditioned glycerol stream 54 is cooled in heat exchange with combined stream 39 at heat exchanger 60 and subsequently reheated at 28 for use in the scrubber 12.

TABLE 1

Material Balance for System in FIG. 1

| Components, lb/hr | 1 | 2 | 3 | 4 | 5 | 6 |
|---|---|---|---|---|---|---|
| N2 | 66 | 66 | 0 | 0 | 0 | 0 |
| CO2 | 27134 | 27125 | 0 | 10 | 0 | 0 |
| CO | 62813 | 62812 | 0 | 1 | 0 | 0 |
| H2 | 3918 | 3918 | 0 | 0 | 0 | 0 |
| Benzene | 1772 | 1585 | 0 | 187 | 0 | 0 |
| Toluene | 940 | 723 | 0 | 217 | 0 | 0 |
| H2S | 95 | 95 | 0 | 0 | 0 | 0 |
| COS | 6 | 6 | 0 | 0 | 0 | 0 |
| HCl | 45 | 36 | 0 | 9 | 0 | 0 |
| H2O | 84141 | 26127 | 2000 | 60014 | 0 | 192 |
| CH4 | 6782 | 6782 | 0 | 0 | 0 | 0 |
| C2H4 | 6363 | 6363 | 0 | 0 | 0 | 0 |
| C2H6 | 2170 | 2170 | 0 | 0 | 0 | 0 |
| Cresol | 368 | 0 | 0 | 368 | 0 | 3 |
| Phenol | 699 | 0 | 0 | 699 | 0 | 0 |
| Naphthalene | 1361 | 45 | 0 | 1297 | 19 | 788 |
| Anthracene | 606 | 13 | 0 | 66 | 526 | 21803 |
| NH3 | 720 | 673 | 0 | 47 | 0 | 0 |
| Glycerol | 0 | 50 | 16000 | 2013 | 13937 | 577689 |
| Methanol | 0 | 0 | 2000 | 2000 | 0 | 0 |

In Table 1, exemplary compositions of streams are given for various points in the system detailed in FIG. 1. The synthesis gas input 20 to the scrubber column 12, containing a first amount of tars preventing utilization, is shown for illustrative purposes to contain the following tar components: 368 lb/hr of cresol; 699 lb/hr phenol; 1361 lb/hr naphthalene; and 606 lb/hr anthracene. The overhead stream from the scrubber column 32 containing a second amount of tars less than the first is shown to contain the following tar components: 0 lb/hr cresol; 0 lb/hr phenol; 45 lb/hr naphthalene; and 13 lb/hr anthracene. Furthermore, the composition of the overhead stream from the stripper column 58 containing the steam and lighter and more volatile tars is shown to contain the following tar components: 368 lb/hr cresol; 699 lb/hr phenol; 1297 lb/hr naphthalene; and 66 lb/hr anthracene. In contrast, the composition of the purged portion of the conditioned glycerol stream 56 is shown for illustrative purposes to contain the following tar components: 19 lb/hr naphthalene and 526 lb/hr anthracene. The recirculated conditioned glycerol stream 54 that is sent to the scrubber column for illustrative purposes is shown to contain: 788 lb/hra naphthalene and 21,803 lb/hr anthracene. The foregoing values are provided for purposes of illustration and are not meant to be limiting.

From the above, it will be appreciated that the process of the present invention facilitates removal from synthesis gas of tars that impeded commercial utilization of the gas. Table 2 illustrates various applications in which synthesis gas may be utilized and approximate levels of acceptable tar concentrations for such applications. Table 2 provides a representative sample of acceptable tar concentrations for various types of applications but is not intended to be exhaustive.

TABLE 2

Types of Utilization

| Type of Utilization | Approximate Acceptable Tar Concentration* |
|---|---|
| Synthesis Gas compression | <500 mg/Nm$^3$ |
| Internal Combustion Engine | <100 mg/Nm$^3$ |
| Gas Turbine | <100 mg/Nm$^3$ |
| Non-condensable Chemical or Fuel synthesis | <0.1 mg/Nm$^3$ |

*mg/Nm$^3$ refers to milligrams per normal cubic meter, meaning normal atmospheric conditions (0° Celsius and 1.013 bar)

The process of the present invention can be tailored to remove an amount of tar to achieve an acceptable tar concentration for a given application.

Figure 2:
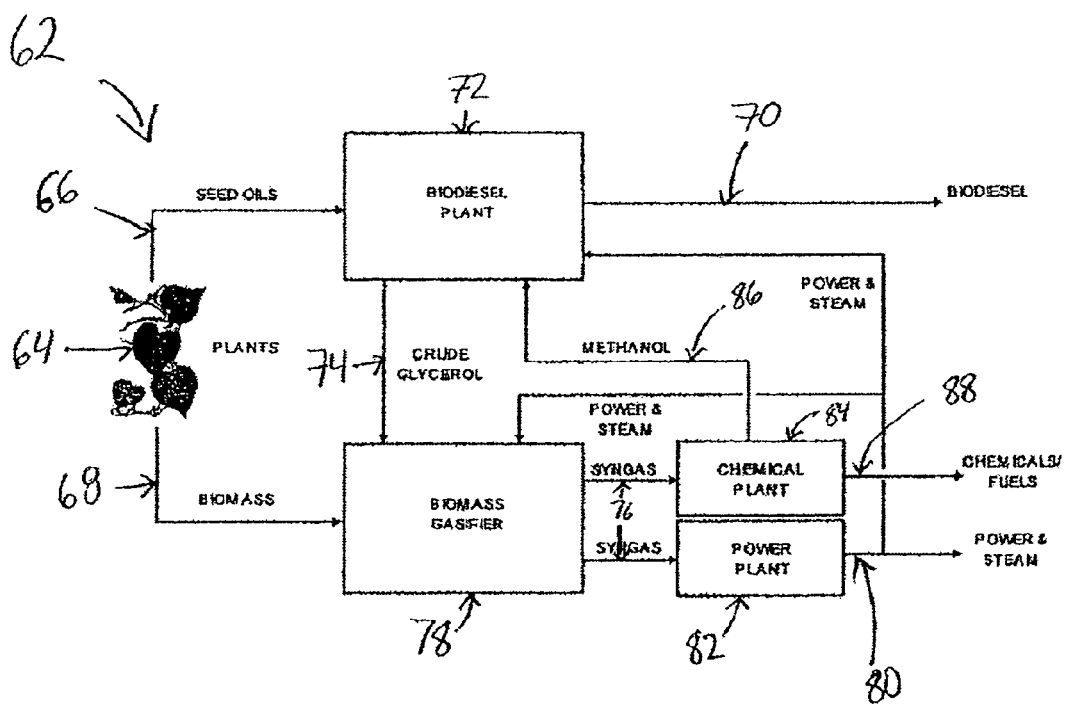
FIG. 2 is a schematic diagram of a system for co-producing biodiesel and synthesis gas in accordance with the present invention.

In FIG. 2 a schematic diagram demonstrates a system 62 for producing biodiesel and gasifying biomass to produce synthesis gas according to the present invention. Plants 64 are treated to extract seed oils 66 resulting in a biomass byproduct 68. The seed oils 66 are used for producing biodiesel 70 in a biodiesel plant 72. The biodiesel plant 72 produces the crude glycerol byproduct 74 which subsequently is used to treat synthesis gas 76 produced by gasification of the biomass byproduct in the biomass gasifier 78. It will be appreciated that the gasifier can include a tar removal system 10 as shown and described above. The resulting synthesis gas 76 from the biomass gasifier that is treated with the crude glycerol 74 from the biodiesel plant 72 is used to produce power and steam 80 in a power plant 82 to power both the biodiesel plant 72 and biomass gasifier 78. The synthesis gas 74 from the biomass gasifier that is treated with the crude glycerol 74 from the biodiesel plant 72 also is sent to a chemical plant 84 wherein methanol 86 is produced for use in the production of biodiesel 70 in the biodiesel plant 72. Additionally, the resulting synthesis gas 76 from the biomass gasifier 78 that is treated with crude glycerol 74 obtained from the biodiesel plant 72 is used to both produce power and steam 80 in the power plant 82, and chemicals and additional fuels 88 in the chemical plant 84, all of which may be used commercially.

Numerous modifications and variations of the present invention are possible in light of the above teachings. It is therefore to be understood that the invention may be practiced otherwise than as specifically described herein.

While various embodiments of the present invention have been described above, they should be understood to have been presented by way of examples only, and not limitation. Thus, the breadth and scope of the present invention should not be limited by the above described embodiments.

What is claimed is:

1. A process for removing tars from synthesis gas, comprising the steps of treating synthesis gas containing a first amount of tars that impede utilization with glycerol to produce a first stream of synthesis gas containing a second amount of tars less than the first amount and a second stream containing a rich glycerol and tars solution wherein the glycerol used in said treatment step is obtained by combining the crude glycerol from a biodiesel process and the rich glycerol and tars solution from said treatment step to make a combined solution; and conditioning the combined solution to obtain conditioned glycerol wherein said conditioning step includes stripping the glycerol and tars from the combined solution to produce a first stream containing steam and tars and a second stream containing conditioned glycerol.

2. A process in accordance with claim 1 wherein the synthesis gas is obtained by gasifying a biomass feedstock to produce synthesis gas containing a first amount of tars that impede utilization.

3. A process in accordance with claim 1 wherein said treatment step includes scrubbing said synthesis gas with said glycerol.

4. A process in accordance with claim 1 further comprising the step of purging an amount of heavy tars and glycerol from the second stream containing conditioned glycerol to produce a first conditioned glycerol stream with a flow rate of a first amount and a second conditioned glycerol stream with a flow rate of a second amount less than the first.

5. A process in accordance with claim 3 wherein said scrubbing step includes feeding the synthesis gas, which is obtained from gasifying a biomass feedstock, and said conditioned glycerol into a scrubber column to produce an overhead stream of synthesis gas containing a second amount of tars less than the first amount and a bottom stream containing a rich glycerol and tars solution.

6. A process in accordance with claim 5 further comprising the step of feeding the overhead stream of synthesis gas containing a second amount of tars less than the first amount into an aqueous scrubber.

7. A process in accordance with claim 1 wherein said stripping step includes feeding the combined solution into a stripper column to produce a stripper overhead stream containing steam and tars and a bottoms stream containing conditioned glycerol.

8. A process in accordance with claim 7 further comprising the step of sending the stripper overhead stream containing steam and tars to a gasifier as a moderating stream.

9. A process in accordance with claim 7 further comprising the steps of condensing and treating the stripper overhead stream containing steam and tars to recover saleable products.

10. A process in accordance with claim 4 further comprising the step of recirculating the conditioned glycerol stream with a flow rate of a first amount for use in said treatment step.

11. A process in accordance with claim 4 further comprising the step of sending the conditioned glycerol stream with a flow rate of a second amount less than the first to a gasifier.

12. A process in accordance with claim 4 further comprising the step of using the conditioned glycerol stream with a flow rate of a second amount less than the first as a liquid fuel in a boiler.

13. A process in accordance with claim 4 further comprising the step of treating the conditioned glycerol stream with a flow rate of a second amount less than the first to recover saleable products.

14. A process in accordance with claim 2 further comprising the step of producing biodiesel from seed oils wherein the crude glycerol used in said conditioning step is a byproduct of the biodiesel producing step.

15. A process in accordance with claim 14 wherein the biomass gasified in a biomass gasifier to produce the synthesis gas is obtained from the biomass byproduct resulting from the harvesting of the seed oils used in said biodiesel producing step.

16. A process in accordance with claim 14 wherein said gasifying step produces methanol; and
wherein said biodiesel producing step includes using the methanol to produce the biodiesel.

17. A process for removing tars from synthesis gas, comprising the steps of:
gasifying a biomass feedstock to produce synthesis gas containing a first amount of tars that impede utilization;
conditioning crude glycerol from a biodiesel process to produce conditioned glycerol wherein said conditioning step includes stripping the glycerol and tars to produce a first stream containing steam and tars and a second stream containing conditioned glycerol; and
treating the synthesis gas containing a first amount of tars that impede utilization with the second stream containing conditioned glycerol to produce a third stream of synthesis gas containing a second amount of tars less than the first amount and a fourth stream containing a rich glycerol and tars solution
wherein said gasifying step produces methanol and said biodiesel process includes using the methanol to produce the biodiesel.

18. A process in accordance with claim 17 wherein said treatment step includes scrubbing said synthesis gas with said second stream containing conditioned glycerol.

19. A process in accordance with claim 17 wherein the biomass gasified in a biomass gasifier to produce the synthesis gas is obtained from the biomass byproduct resulting from the harvesting of seed oils used in said biodiesel producing step.

* * * * *